United States Patent
Gambuzza et al.

(10) Patent No.: US 12,370,916 B2
(45) Date of Patent: Jul. 29, 2025

(54) ADAPTIVE PRE-CHARGE CONTROL FOR ELECTRIC VEHICLE DC LINK CAPACITOR

(71) Applicant: Littelfuse, Inc., Chicago, IL (US)

(72) Inventors: Michael J. Gambuzza, Boston, MA (US); Cesar Martinez, San Sebastian (ES); Martin Schulz, Erwitte (DE)

(73) Assignee: Littelfuse, Inc., Chicago, IL (US)

( * ) Notice: Subject to any disclaimer, the term of this patent is extended or adjusted under 35 U.S.C. 154(b) by 360 days.

(21) Appl. No.: 17/971,915

(22) Filed: Oct. 24, 2022

(65) Prior Publication Data

US 2024/0131950 A1   Apr. 25, 2024
US 2024/0227609 A9   Jul. 11, 2024

(51) Int. Cl.
*B60L 53/62* (2019.01)
*H02J 7/00* (2006.01)
*H02J 7/34* (2006.01)

(52) U.S. Cl.
CPC ............ *B60L 53/62* (2019.02); *H02J 7/0047* (2013.01); *H02J 7/0063* (2013.01); *H02J 7/00711* (2020.01); *H02J 7/007182* (2020.01); *H02J 7/345* (2013.01); *B60L 2240/547* (2013.01)

(58) Field of Classification Search
CPC . B60L 53/62; B60L 2240/547; H02J 7/00711; H02J 7/007182; H02J 7/0047; H02J 7/0063; H02J 7/345
USPC ......................................................... 307/10.1
See application file for complete search history.

(56) References Cited

U.S. PATENT DOCUMENTS

| | | | |
|---|---|---|---|
| 9,573,474 B2 * | 2/2017 | Mensah-Brown | B60L 50/40 |
| 9,954,353 B2 * | 4/2018 | Hasan | B60L 50/30 |
| 10,046,663 B2 * | 8/2018 | Pritelli | H01H 9/542 |
| 10,081,247 B2 * | 9/2018 | Lee | B60L 3/0046 |
| 10,414,276 B2 * | 9/2019 | Song | H02J 7/02 |
| 10,693,367 B1 * | 6/2020 | Chatterjee | H02M 1/36 |
| 2015/0147603 A1 * | 5/2015 | Jung | B60L 58/12 429/61 |
| 2016/0082844 A1 * | 3/2016 | King | H02M 3/158 307/10.1 |
| 2017/0117722 A1 * | 4/2017 | Shen | H02J 3/381 |
| 2021/0175837 A1 | 6/2021 | Wang | |

(Continued)

FOREIGN PATENT DOCUMENTS

| | | |
|---|---|---|
| CN | 113556042 A | 10/2021 |
| CN | 113615031 A | 11/2021 |

(Continued)

OTHER PUBLICATIONS

Extended European Search Report for European Application No. 23204611.0, dated Mar. 18, 2024, 12 pages.

(Continued)

*Primary Examiner* — Alfonso Perez Borroto
(74) *Attorney, Agent, or Firm* — KDW Firm PLLC

(57) ABSTRACT

An adaptive pre-charge control circuit includes include a high-voltage switch and a control circuit. The high-voltage switch controls the flow of current between an electric battery and a DC link capacitor, the electric battery to supply power to an electric vehicle. The DC link capacitor is made up of a sum of individual input capacitors of multiple subunits within an electric vehicle. The control circuit sends a PWM signal to the high-voltage switch based on a difference between an electric battery voltage and a DC link capacitor voltage.

17 Claims, 4 Drawing Sheets

(56) References Cited

U.S. PATENT DOCUMENTS

| | | |
|---|---|---|
| 2021/0261009 A1* | 8/2021 | Eull .......................... H02J 7/06 |
| 2022/0281335 A1* | 9/2022 | Golriz ..................... B60L 55/00 |
| 2024/0131950 A1* | 4/2024 | Gambuzza .............. H02J 7/345 |

FOREIGN PATENT DOCUMENTS

| | | |
|---|---|---|
| CN | 115021342 A | 9/2022 |
| EP | 3982508 A1 | 4/2022 |
| EP | 4052958 A1 | 9/2022 |
| TW | 201121189 A | 6/2011 |
| WO | 2020194341 A1 | 10/2020 |

OTHER PUBLICATIONS

Munari et al., "How to Design a Precharge Circuit for Hybrid and Electric Vehicle Applications," WP-00012-Rev. 12/11/202 EN, Aug. 2020, p. 1-13, (C) Sensata Technologies, Inc., WWW. Sensata.com.

\* cited by examiner

ADAPTIVE PRE-CHARGE CONTROL FOR ELECTRIC VEHICLE DC LINK CAPACITOR

FIELD OF THE DISCLOSURE

Embodiments of the present disclosure relate to solid state battery disconnect and protection circuits, including the pre-charge control function.

BACKGROUND

Pre-charge circuits are used in high voltage DC applications with capacitive loads that can result in high inrush currents during power up. Pre-charge of the powerline voltages is a preliminary mode which limits the inrush current. The pre-charge circuits thus prevent damage to system components by blocking high amperage current spikes.

A high voltage system with a large capacitive load can be exposed to high electric current during initial turn-on. If not limited, the current can cause considerable stress or damage to the system components, including, but not limited to, causing contactors to weld closed.

In electric vehicle applications, battery disconnects are implemented using contactors, overcurrent protection is implemented with a combination of the same contactors controlled by specific circuitry and additional protection elements such as fuses or pyrofuses, and pre-charge control is implemented with additional dedicated circuitry.

In electric vehicle applications, the large capacitive load is the DC link in the electric motor. The "DC link capacitor" is actually the sum of several parallel capacitors in the subunits within the electric vehicle, one for the electric motor, another for the air conditioning compressor, another for the window enabling, and so on.

Pre-charging of the DC link capacitor will occur with each vehicle start. The battery voltage may be different in each vehicle start, depending on the battery charge state. Thus, the battery voltage may be any value within the operating range of the battery, for example, 550V-800V in an 800V battery system. The pre-charging circuit limits the inrush current to slowly charge the downstream DC link capacitor. Once the voltage of the DC link capacitor is close to that of the battery, the main switches are permitted to close. Pre-charge circuits thus allow the current to flow in a controlled manner during vehicle startup.

Pre-charge circuits in electric vehicles, built by an auxiliary switch in series with a large value resistance and placed in parallel with the main switch, control the inrush current going into the vehicle during startup. The main switch is open and the auxiliary switch closed, so that the DC link capacitor is slowly charged, as determined by the resistance. Once the DC link capacitor is sufficiently charged (so that its voltage is close to that of the battery), the main switch is closed all the way and the battery is able to safely supply power to the vehicle.

The bulky resistors used to implement legacy pre-charge circuits are expensive and occupy a lot of space within the electric vehicle. Additionally, pre-charge contactors are electromechanical components subject to wear and provide a slow response.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a solid state battery disconnect and protection circuit with an adaptive pre-charge control circuit in accordance with the present disclosure may include a high-voltage switch and a control circuit. The high-voltage switch is connected between an electric battery and a DC link capacitor of an electric vehicle, and the electric vehicle is powered by the electric battery. The control circuit measures a voltage of the electric battery and measures a voltage of the DC link capacitor. The control circuit also sends a pulse width modulated (PWM) signal to the high-voltage switch based on a difference between the electric battery voltage and the DC link capacitor voltage.

Another exemplary embodiment of an adaptive pre-charge control circuit in accordance with the present disclosure may include a high-voltage switch and a control circuit. The high-voltage switch controls the flow of current between an electric battery and a DC link capacitor. The DC link capacitor is made up of a sum of individual input capacitors of multiple subunits within an electric vehicle. The electric battery supplies power to the electric vehicle. The control circuit sends a pulse width modulated signal to the high-voltage switch based on a difference between an electric battery voltage and a DC link capacitor voltage.

DETAILED DESCRIPTION

An adaptive pre-charge control circuit is disclosed for providing pre-charge capability in an electric vehicle. The adaptive pre-charge control circuit is disposed between an electric battery that supplies power to an electric vehicle and the load of the electric vehicle. By issuing a pulse-width modulated signal to a high-voltage switch, the voltage of a DC link capacitor representing the capacitors of the vehicle load can be slowly changed. Once the voltage of the DC link capacitor is close to that of the electric battery, the high-voltage switch is turned on, enabling current to safely be delivered to the load. The adaptive pre-charge control circuit includes overvoltage protection and current limiting features.

Figure 1:
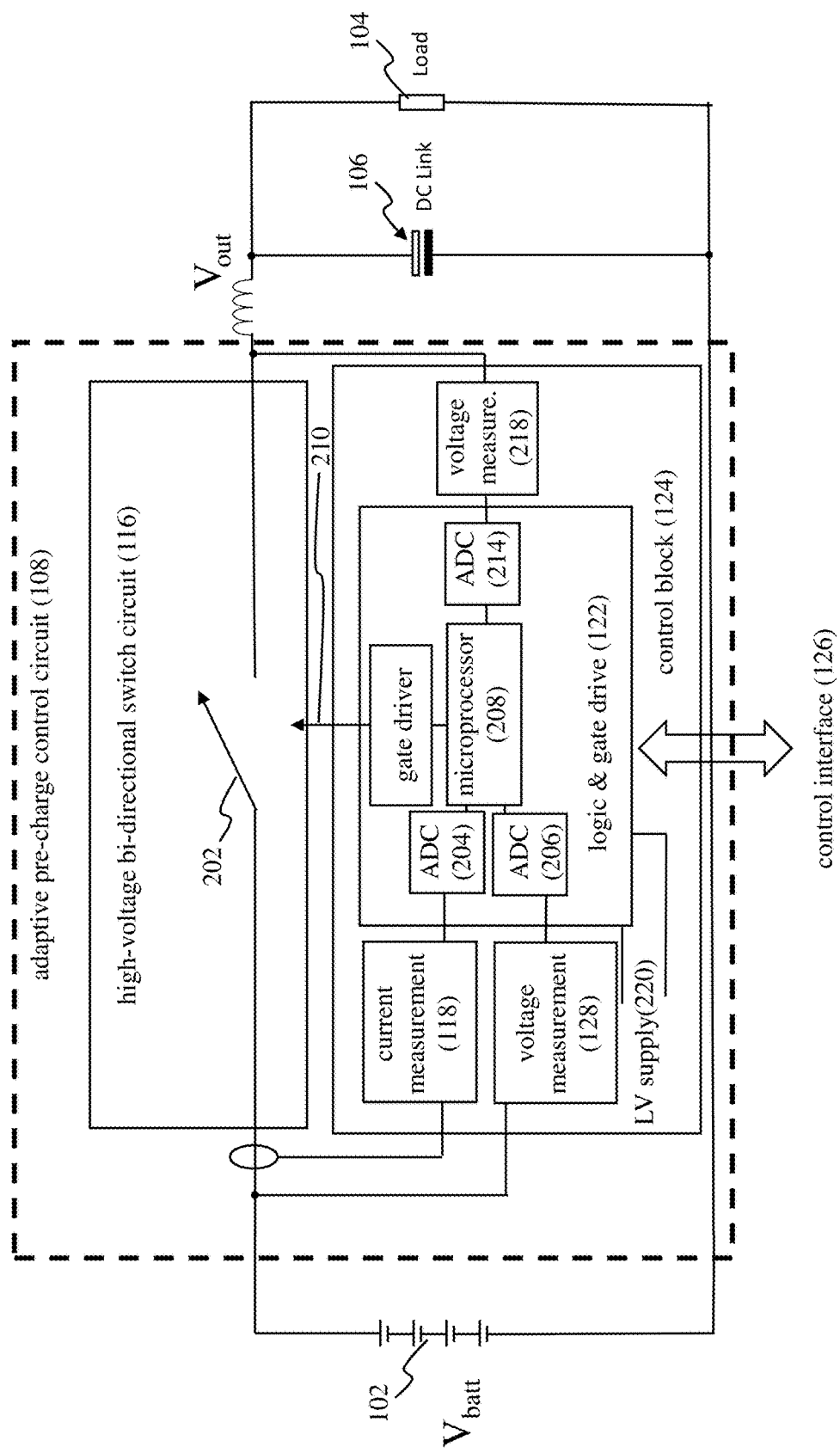
FIG. 1 is a diagram illustrating an adaptive pre-charge control circuit for use in an electric vehicle system, in accordance with exemplary embodiments.

FIG. 1 is a representative drawing of an adaptive pre-charge control circuit 108 for providing pre-charge capability in a solid state battery disconnect and protection system 100, according to exemplary embodiments. The solid state battery disconnect and protection system 100 consists of an electric vehicle (EV) battery 102, a load 104, and a DC link capacitor 106, with the adaptive pre-charge control circuit 108 disposed between the EV battery 102 and the load 104.

Principally, the load 104 is an EV motor of an electric vehicle, but the load also includes other powered components within the electric vehicle, such as air conditioning compressors, window enabling motors, and so on. Each subunit in the vehicle has an input capacity, with the individual capacitors and number of subunits being unknown. The sum of individual capacitors is the DC link capacity ($C_{DC}$), symbolized by the DC link capacitor 106.

The adaptive pre-charge control circuit 108 is a solid state battery disconnect and protection circuit featuring a high-voltage bi-directional switch circuit 116, or high-voltage switch 116 for short, and a control block 124. Solid state battery disconnect and protection circuits use a microprocessor or microcontroller coupled with a current sensor to sample a waveform and detect any overcurrent scenarios. Solid state battery disconnect and protection circuits have very fast response time relative to traditional circuit breakers. The high-voltage switch 116 of the adaptive pre-charge control circuit 108 turns on (closes) or off (opens) to control (enable or prevent) current flow between the EV battery 102 and the load 104. In exemplary embodiments, the control block 124 issues a pulse width modulated (PWM) signal 210 to the high-voltage switch 116, causing a switch 202 therein to turn on and off at a ratio based on the duty cycle of the PWM signal. The on/off rate or number of switching events per time is defined by the PWM switching frequency. The duty cycle defines the ratio between on-time and the switching period.

A voltage, $V_{batt}$, of the EV battery 102 and a voltage, $V_{out}$, of the DC link capacitor 106 are shown. In exemplary embodiments, the adaptive pre-charge control circuit 108 is designed to enable slow charging of the DC link capacitor 106 until its voltage is close to the voltage of the EV battery 102. Once a predefined difference, $V_{diff}$, between $V_{out}$ and $V_{batt}$ is reached, the high-voltage switch 116 will turn on (close), allowing current to flow freely between the EV battery 102 and the load 104. In this way, the EV battery 102 is able to safely power the load. Stated mathematically, once $V_{batt} - V_{out} \leq V_{diff}$, then the switch will remain closed until the electric vehicle is turned off.

The control block 124 features a microprocessor 208 and three analog-to-digital converters (ADCs) 204, 206, and 214. The ADC 204 measures the battery voltage, $V_{batt}$, while the ADC 206 measures the output voltage, $V_{out}$. Before a computation can be made, the microprocessor 208 is presented with a measurement or a digital representation of the battery voltage, $V_{batt}$, and the output voltage, $V_{out}$. The ADCs 204 and 206 measure and convert the voltages to digital values. The microprocessor 208 can then read these results and compute the voltage difference, $V_{diff}$. Further, the microprocessor 208 generates the PWM pattern to turn the switch 202 on and off. The control block 124 also features current measurement 118 and voltage measurement 128 at the input, $V_{batt}$, as well as voltage measurement 218 at the output, $V_{out}$. In exemplary embodiments, the logic and gate drive 122 of the adaptive pre-charge control circuit 108 cause issuance of the PWM signal 210 to the high-voltage switch 116. The PWM signal 210 will enable the high-voltage switch 202 to be turned on or off, thus enabling or preventing current flow between the EV battery 102 and the DC link capacitor 106. By slowly charging the DC link capacitor 106, the current protection block of the adaptive pre-charge control circuit 108 causes the voltage across the DC link capacitor 106 to increase until $V_{out}$ reaches a voltage near that of the EV battery 102, $V_{batt}$, where the "near voltage" is given by $V_{diff}$. The adaptive pre-charge control circuit 108 thus implements pre-charge control with a PWM control signal, controlling the pulse width profile to keep the maximum current during the pre-charge within a safe limit. In exemplary embodiments, the value of $V_{diff}$ may be set by the logic and may depend on manufacturer preference, battery voltage, and other factors. In exemplary embodiments, $V_{diff}$ is programmable. Essentially, the minimum $V_{diff}$ is determined to operate such that the adaptive pre-charge control circuit 108 remains in a Safe Operating Area (SOA). If the $V_{diff}$ threshold is set too low below the final battery voltage, it may exceed the SOA in terms of current surge. A dependent factor is the capacitance of the DC link capacitor 106. In exemplary embodiments, a determination is made of an ideal safe limit of the threshold. The logic and gate drive 122 of the control block 124 is connected to a control interface 126, which may be a wired or a wireless connection.

In exemplary embodiments, the PWM signal 210 of the adaptive pre-charge control circuit 108 supports faster pre-charge using an adaptive measurement method over prior art models which use standard fixed RC time constants. In some embodiments, the current rate of change is measured to help determine an optimum PWM profile.

In exemplary embodiments, the adaptive pre-charge control circuit 108 is part of the solid state battery disconnect and protection system 100. Regardless of whether in pre-charge mode or regular mode, an overcurrent event will quickly open the high-voltage switch 116. In exemplary embodiments, the sensor used by the current measurement 118 is a Hall-effect sensor that has a pre-defined threshold such that, when the current reaches the threshold, a logic signal will be issued to the logic and gate drive 122. As an alternative to using Hall sensors, the current measurement 118 may use shunt resistances to sense an overcurrent, in some embodiments. In exemplary embodiments, the adaptive pre-charge control circuit 108 also includes a current limiting function. The current sensor in FIG. 1 consists of the current measurement 118, with the circle denoting the wire being measured. The magnetic flux generated by the flowing current is converted to a voltage via the Hall effect. The voltage is compared to a reference in the sensor that represents the threshold voltage indicating an overcurrent. When an overcurrent occurs, a single logic signal is generated and sent to the logic and gate drive 122. In exemplary embodiments, this happens within millisecond timeframe.

If the current exceeds a certain limit, the current limiting function is triggered and the adaptive pre-charge control circuit 108 disconnects the battery and load (and stops charging). Without the current limiting function, the current would rise unbounded, stressing or damaging components and interconnects.

In exemplary embodiments, the switch 202 of the high-voltage switch 116 is a solid state switching device, such as an insulated gate bipolar junction transistor (IGBT), a semiconductor such as a power metal-oxide semiconductor field-effect transistor (MOSFET), a thyristor, a silicon-controlled rectifier (SCR), a triode for alternating current (TRIAC), or any other suitable high-power controlled solid state device. The switch 202 connects or disconnects the EV battery 102 to the vehicle's high-voltage on-board systems. In exemplary embodiments, the switch 202 is bi-directional to allow the EV battery 102 to supply the vehicle (load 104) and to allow a charger to supply the battery. In exemplary embodiments, the switch 202 is controlled by a PWM signal 210 coming from the control block 124.

Pre-charge circuits are commonly part of high-voltage systems, such as electronic vehicle systems, in which downstream capacitance can be exposed to inrush current when the vehicle is turned on. These pre-charge circuits typically have a large value resistor that is switched in before the vehicle is started and the DC link capacitor is slowly charged. Once the capacitor is sufficiently charged, the switch is closed entirely. Having a set pre-charge threshold does not account for battery discharge after vehicle use. Further, the prior art pre-charge circuits do not utilize pulse-width modulation to control the charging, as is done with the adaptive pre-charge control circuit 108. The adaptive pre-charge control circuit 108 thus provides a novel method to detect battery discharge and set a pre-charge threshold based on initial and final values of battery charge.

Figure 2:
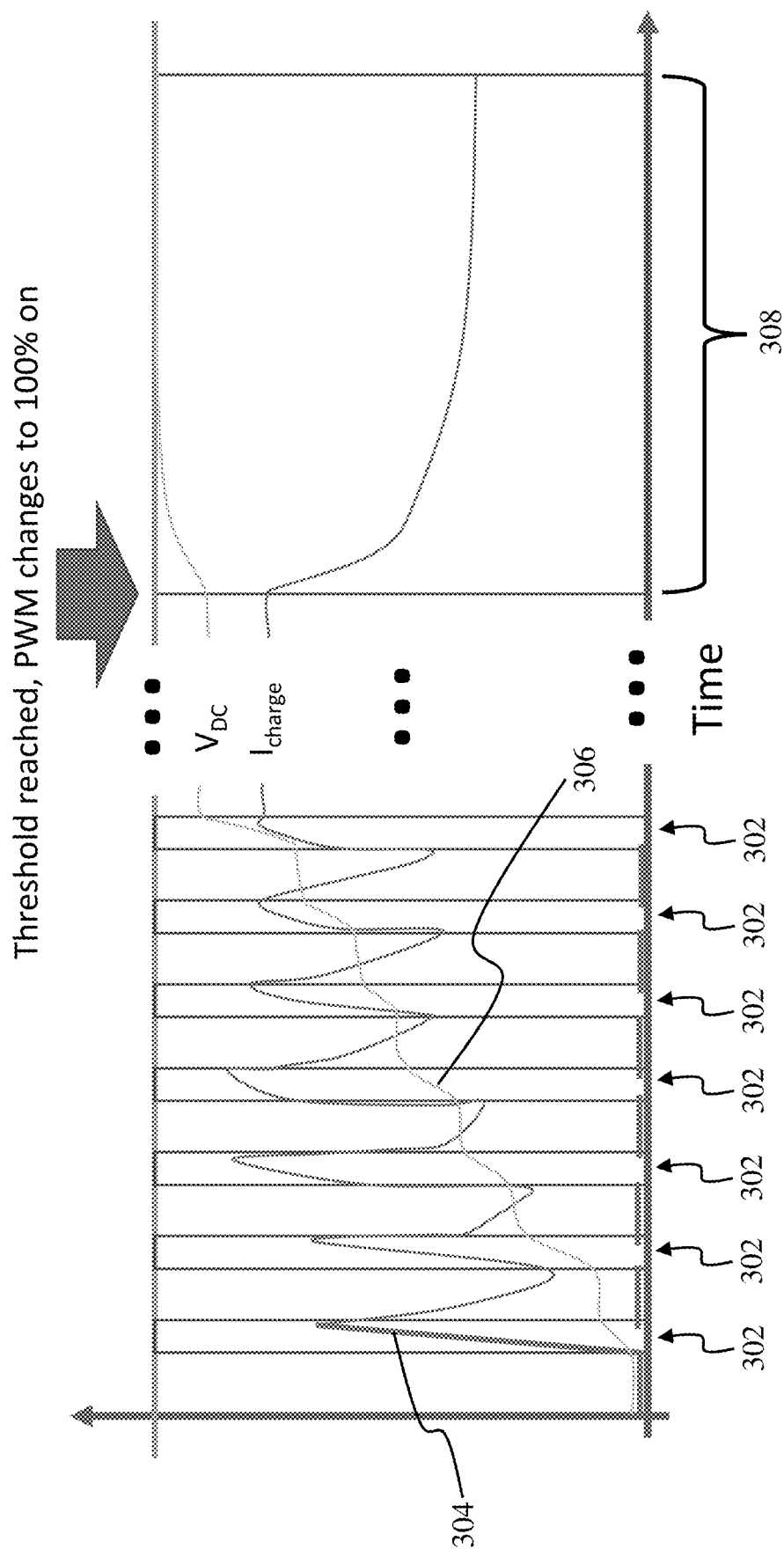
FIG. 2 is a diagram illustrating the operating principle of pulse width modulation used by the adaptive pre-charge control circuit of FIG. 1, according to exemplary embodiments.

FIG. 2 is a representative schematic drawing of the operating principle of pulse width modulation used by the adaptive pre-charge control circuit 108, according to exemplary embodiments. In exemplary embodiments, the pulse width of the PWM signal 210 of the adaptive pre-charge control circuit 108 is adapted based on the voltage of $V_{batt}$. In exemplary embodiments, the adaptive pre-charge control circuit 108 measures the initial battery voltage, $V_{batt}$, and the DC link capacitor 106 voltage, $V_{out}$, compares it to the pre-programmed threshold, $V_{diff}$, and decides accordingly whether to stay in the PWM condition, in which short pulses are issued, or to move to the fully ON condition, in which the switch is closed.

If the decision is made comparing $V_{out}$ ($V_{DC}$) to a fixed threshold, different effects may appear depending on how the fixed threshold is set. This is done for two reasons: 1) if the threshold is set too low to consider minimum possible battery voltage, when the battery is fully charged, the inrush current may be too high and 2) if the threshold is set too high to minimize inrush current if the battery is discharged, it may never reach the pre-charge end threshold. The adaptive pre-charge control circuit 108 thus adapts to the health of the battery to solve both conditions.

For the adaptive pre-charge control circuit 108, after turning on the bi-directional switch 202, the charging current, $I_{charge}$, builds up. In FIG. 2, pulse intervals 302 are shown, with small amounts of current 304, $I_{charge}$, being issued at each pulse. As the DC link capacitor 106 is initially at zero volts, the charging current without control would be similar to a short circuit current and potentially lead to destruction. By issuing a short pulse, the current remains in safe limits and the DC link capacitor 106 is charged a little. As the current is driven by the voltage difference, $V_{diff}$, between the battery voltage, $V_{batt}$, and the DC link voltage, $V_{DC}$, a growing DC link voltage 306 leads to a lower current for the next pulse. With each pulse, the DC link voltage 306 is increased. From a certain difference, known as the "threshold", the PWM signal 210 can be changed to "turned on". The pulse interval 308 is quite large compared to the earlier pulse intervals 302. The DC link voltage, $V_{DC}$, quickly reaches the battery voltage, $V_{batt}$, and the difference between the two becomes zero, thus completing the pre-charging operation. The adaptive pre-charge control circuit 108 thus eliminates the need for bulky pre-charging resistors used in legacy electric vehicles, as well as the correlated losses.

Figure 3A:
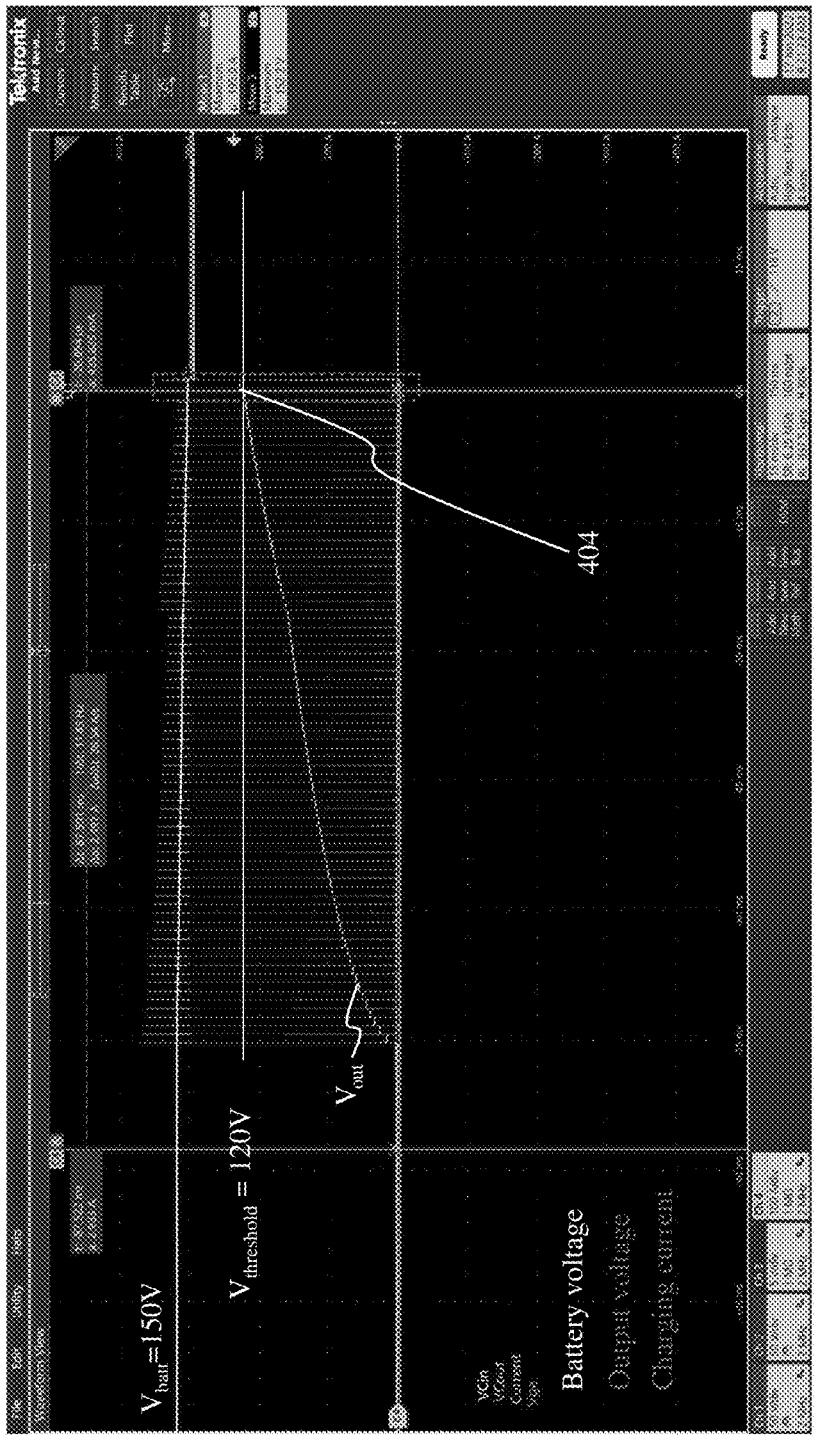
FIGS. 3A-3B are timing diagrams of the adaptive pre-charge control circuit of FIG. 1, in accordance with exemplary embodiments.
Figure 3B:
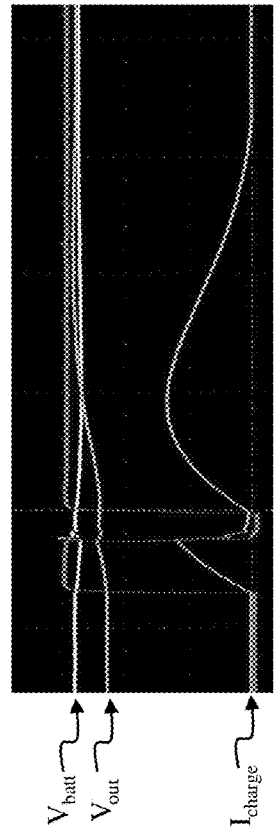

FIGS. 3A-3B are representative timing diagrams of empirical tests performed in an EV system, according to exemplary embodiments, which features PWM controlled pre-charge operation but lacks adaptive pre-charge control. The battery voltage of the EV system, $V_{batt}$, can vary from 120V to 170V at the moment of starting the vehicle, depending on the battery charge. The fixed end-of-pre-charge threshold voltage, $V_{threshold}$, is set to 120V.

FIGS. 3A-3B illustrate a case in which the battery is half charged, and $V_{batt}$ is 150V. At about −0.70 ms, vertical lines indicate the PWM controlled pre-charge operation. A steady increasing output voltage, $V_{out}$, is shown. At point 404, the output voltage, $V_{out}$, reaches the threshold voltage of 120V. The PWM pulse is released, and $V_{out}$ reaches $V_{in}$ ($V_{batt}$) with a current peak, which in this case is well within the limits for safe operation.

Figure 4A:
FIGS. 4A-4B are timing diagrams of the adaptive pre-charge control circuit of FIG. 1, in accordance with exemplary embodiments.
Figure 4B:
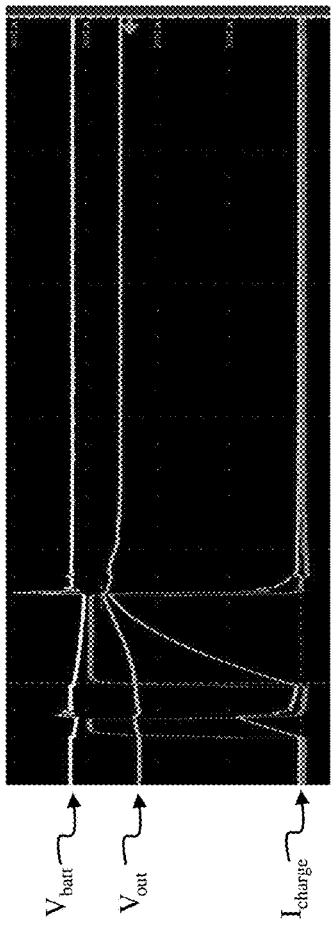

FIGS. 4A-4B illustrate a case in which the battery is almost fully charged, and $V_{batt}$ is 170V. At −0.75 ms, vertical lines indicate the PWM controlled pre-charge operation. A steadily increasing output voltage, $V_{out}$, is shown. At point 504, the output voltage, $V_{out}$, reaches the threshold voltage of 120V. The PWM pulse is released and the current peak exceeds the threshold for safe operation, which may lead to overcurrent damages in the system.

In addition, if the output voltage, $V_{out}$, does not reach the fixed end-of-pre-charge threshold voltage, the device will never leave the PWM controlled pre-charge operation. The latest two cases (FIGS. 3A-3B and FIGS. 4A-4B) thus illustrate the need for adaptive control. Thus, using the adaptive pre-charge control circuit 108, when the electric vehicle is started, the PWM pre-charge pulse width is adaptive, depending on the voltage of the battery, $V_{batt}$. For example, if the battery is 800V initially and discharges to 750V, the pre-charge on a subsequent vehicle restart will adjust the pulse width appropriately to charge the DC link capacitor 106 safely, additionally setting an end-of-pre-charge threshold based on the "new" battery voltage. The pre-charge cycle will stop when $V_{in}$ ($V_{batt}$)=$V_{out}$ ($V_{DC}$). At that point, DC link capacitor 106 is charged sufficiently, and the high-voltage switch 116 is turned fully ON by the microprocessor 208. Thus, in exemplary embodiments, the adaptive pre-charge control circuit 108 avoids a very large charging current and manages the PWM duty cycle depending on how much the battery has discharged from the initial state.

The adaptive pre-charge control circuit 108 thus offers several advantages over legacy pre-charge control circuits. The adaptive pre-charge control circuit 108 can monitor battery voltage dynamically to determine an optimum pre-charge threshold. The adaptive pre-charge control circuit 108 PWM can support faster pre-charging using an adaptive measurement method over legacy systems that use fixed RC time constants. And the adaptive pre-charge control circuit 108 can measure the current rate of change to determine an optimum PWM profile.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. An adaptive pre-charge control circuit, for use in a battery disconnect and protection system, the adaptive pre-charge control circuit comprising:

a high-voltage switch coupled between an electric battery and a DC link capacitor of an electric vehicle, wherein the electric vehicle is powered by the electric battery; and a control circuit, comprising:

a microprocessor;

a logic and gate drive having an input coupled to the microprocessor and an output coupled to send a pulse width modulated (PWM) signal to the high-voltage switch;

a first voltage block coupled to a first side of the high-voltage switch, to receive a voltage measurement $V_{batt}$ representing a voltage of the electric battery at a start up of a high voltage system;

a first analog-to-digital converter (ADC) having an input coupled to receive the voltage measurement $V_{batt}$ and an output connected to the microprocessor;

a second voltage block coupled to a second side of the high-voltage switch, to receive a voltage measurement $V_{out}$ representing an output voltage connected to the DC link capacitor;

a second ADC having an input coupled on the second side of the high-voltage switch, to receive the voltage measurement $V_{out}$ and an output connected to the microprocessor, wherein the control circuit is configured to:

dynamically adjust a width of the PWM signal based on a measurement of a value, $V_{diff}$, where the measurement of the value of $V_{diff}=V_{batt}-V_{out}$; and dynamically adjust a $V_{threshold}$ based upon a value of $V_{batt}$ at the start up, where $V_{threshold}$ represents a value of $V_{out}$ when the high voltage switch is switched fully ON.

2. The adaptive pre-charge control circuit of claim 1, the control circuit further comprising:

a current sensor, having a reference threshold voltage, indicative of an overcurrent condition, the current sensor being coupled to the electric battery on the first side of the high voltage switch to perform a current measurement of the current of the electric battery;

a third ADC having an input coupled to receive the current measurement from the current sensor and an output connected to the microprocessor;

wherein, upon the overcurrent condition being detected, the microprocessor is coupled to generate and send a logic signal to the logic and gate drive to disconnect the electric battery.

3. The adaptive pre-charge control circuit of claim 1, further comprising an overvoltage protection circuit to protect the high-voltage switch from back-EMF.

4. The adaptive pre-charge control circuit of claim 1, wherein the high-voltage switch comprises one or more semiconductors.

5. The adaptive pre-charge control circuit of claim 4, the high-voltage switch further comprising an insulated gate bipolar transistor (IGBT).

6. The adaptive pre-charge control circuit of claim 1, the high-voltage switch further comprising a power metal-oxide semiconductor field-effect transistor.

7. The adaptive pre-charge control circuit of claim 1, wherein the DC link capacitor comprises a capacitance of an electric motor of the electric vehicle.

8. The adaptive pre-charge control circuit of claim 1, wherein the DC link capacitor comprises a sum of capacitances of subunits of the electric vehicle.

9. A method of managing a pre-charge operation of a battery disconnect and protection system, the method comprising:

providing a logic and gate drive to send a pulse width modulated (PWM) signal to control a high-voltage switch;

receiving voltage measurement $V_{batt}$ that represents a battery voltage at a start up of the battery disconnect and protection system from a first analog-to-digital converter (ADC) on a first side of the high-voltage switch;

receiving a voltage measurement $V_{out}$ representing an output voltage connected to a DC link capacitor from a second ADC having an input coupled on a second side of the high-voltage switch;

dynamically adjusting a width of the PWM signal based on a measurement of a value, $V_{diff}$, where the measurement of the value $V_{diff}=V_{batt}-V_{out}$; and dynamically adjusting a threshold for $V_{threshold}$ based upon a value of $V_{batt}$ at the start up, where $V_{threshold}$ represents a value of $V_{out}$ when the high voltage switch is switched fully ON.

10. The method of claim 9, further comprising:

performing a current measurement at a current sensor, coupled to battery on the first side of the high-voltage switch;

receiving the current measurement at a third ADC, and outputting a outputting a digital signal based upon the current measurement to a microprocessor;

comparing a value of the digital signal to a reference threshold voltage to determine an overcurrent condition in the battery disconnect and protection system; and when the overcurrent condition is detected, sending a logic signal to the logic and gate drive to disconnect the electric battery.

11. The method of claim 10, the current measurement is performed by measuring a magnetic flux generated by the current, and converting the magnetic flux to a voltage signal that represents the current.

12. The method of claim 9, further comprising providing an overvoltage protection circuit to protect the high-voltage switch from back-EMF.

13. The method of claim 9, wherein the high-voltage switch comprises one or more semiconductors.

14. The method of claim 13, the high-voltage switch further comprising an insulated gate bipolar transistor (IGBT).

15. The method of claim 9, the high-voltage switch further comprising a power metal-oxide semiconductor field-effect transistor.

16. The method of claim 9, wherein the DC link capacitor comprises a capacitance of an electric motor of the electric vehicle.

17. The method of claim 9, wherein the DC link capacitor comprises a sum of capacitances of subunits of the electric vehicle.

* * * * *